(12) United States Patent
Dong et al.

(10) Patent No.: US 10,057,139 B2
(45) Date of Patent: Aug. 21, 2018

(54) MAINTAIN A SERVICE ON A CLOUD NETWORK BASED ON A SCALE RULE

(71) Applicant: HEWLETT-PACKARD DEVELOPMENT COMPANY, L.P., Houston, TX (US)

(72) Inventors: Jing Dong, Roseville, CA (US); John M Green, Roseville, CA (US); Phyllis Gallagher, Roseville, CA (US); Aswini Kumar, Roseville, CA (US); Anupriya Ramraj, Roseville, CA (US); Burton Akira Hipp, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 189 days.

(21) Appl. No.: 14/909,584

(22) PCT Filed: Aug. 30, 2013

(86) PCT No.: PCT/US2013/057738
§ 371 (c)(1),
(2) Date: Feb. 2, 2016

(87) PCT Pub. No.: WO2015/030828
PCT Pub. Date: Mar. 5, 2015

(65) Prior Publication Data
US 2016/0191343 A1 Jun. 30, 2016

(51) Int. Cl.
*G06F 15/173* (2006.01)
*H04L 12/24* (2006.01)
(Continued)

(52) U.S. Cl.
CPC ........ *H04L 41/5019* (2013.01); *G06F 9/5083* (2013.01); *H04L 47/70* (2013.01); *H04L 67/1097* (2013.01)

(58) Field of Classification Search
CPC .. H04L 41/3019; H04L 47/70; H04L 67/1097
(Continued)

(56) References Cited

U.S. PATENT DOCUMENTS 9,183,189 B1 * 11/2015 Thakare .............. G06F 17/2252
9,363,154 B2 * 6/2016 Akolkar ................ H04L 41/147
(Continued)

FOREIGN PATENT DOCUMENTS

| CN | 1728167 A | 2/2006 |
|---|---|---|
| CN | 1751294 A | 3/2006 |
| EP | 2568383 A1 | 3/2013 |

OTHER PUBLICATIONS

Bunch, C. et al., Neptune: A Domain Specific Language for Deploying HPC Software on Cloud Platforms, Jun. 8, 2011, 10 pages, <http://www.cs.ucsb.edu/~ckrintz/papers/sciencecloud11.pdf>.
(Continued)

*Primary Examiner* — Anthony Mejia
(74) *Attorney, Agent, or Firm* — Tong, Rea, Bentley & Kim, LLC

(57) ABSTRACT

Maintaining a service on a cloud network may include receiving a set of status data associated with the service and performing a scale action on the cloud network based on a scale rule applied to the set of status data. The set of status data may be related to a set of resources utilized by the service, a performance level of the service, and a workload volume of the service. The scale rule may include a utilization condition, a quality condition, a workload condition, and a budget condition.

20 Claims, 3 Drawing Sheets

(51) Int. Cl.
*G06F 9/50* (2006.01)
*H04L 12/911* (2013.01)
*H04L 29/08* (2006.01)

(58) Field of Classification Search
USPC ........................................................ 709/226
See application file for complete search history.

(56) References Cited

U.S. PATENT DOCUMENTS

| | | | |
|---|---|---|---|
| 2010/0050172 A1 | 2/2010 | Ferris | |
| 2010/0185961 A1 | 7/2010 | Fisher et al. | |
| 2011/0153824 A1 | 6/2011 | Chikando et al. | |
| 2011/0258621 A1 | 10/2011 | Kern | |
| 2012/0204187 A1 | 8/2012 | Breiter et al. | |
| 2012/0233328 A1 | 9/2012 | Iyoob et al. | |
| 2013/0117157 A1 | 5/2013 | Iyoob et al. | |
| 2013/0179881 A1* | 7/2013 | Calder | G06F 9/5072 718/1 |
| 2013/0179894 A1* | 7/2013 | Calder | G06F 9/5027 718/104 |
| 2013/0179895 A1* | 7/2013 | Calder | G06F 9/5077 718/104 |
| 2014/0244311 A1* | 8/2014 | Dawson | G06Q 40/08 705/4 |
| 2014/0282217 A1* | 9/2014 | Musa | G06F 3/0481 715/781 |

OTHER PUBLICATIONS

Cloud Taxonomy, Gravitant, OpenCrod, 2010, 1 page, <http://cloudtaxonomy.opencrowd.com/taxonomy/infrastructure-as-a-service/cloud-broker/gravitant/ >.

Han, R. et al., Lightweight Resource Scaling for Cloud Applications, Jun. 18, 2012, 9 pages, <http://www.doc.ic.ac.uk/~rh1910/papers/Lightweight_Resource_Scaling_for_Cloud_Applications.pdf>.

International Search Report and Written Opinion, PCT Patent Application No. PCT/US2013/057738, Jun. 2, 2014, 12 pages.

Trieu C. Chieu et al., Dynamic Scaling of Web Applications in a Virtualized Cloud Computing Environment. IEEE International Conference on e-Business Engineering, 2009, pp. 28.

Duncan McGreggor, "Autoscaling API for Heat," Mar. 20, 2013, pp. 1-3 [online], Canonical Ltd., Retrieved from the Internet on Nov. 15, 2017 at URL: <https://web.archive.org/web/20130527194022/https:/blueprints.launchpad.net/heat/+spec/heat-autoscaling >.

Hewlett-Packard Development Company, L.P., "Dynamic Workload Management for Private Cloud," Business White Paper, Apr. 2012, pp. 1-8.

* cited by examiner

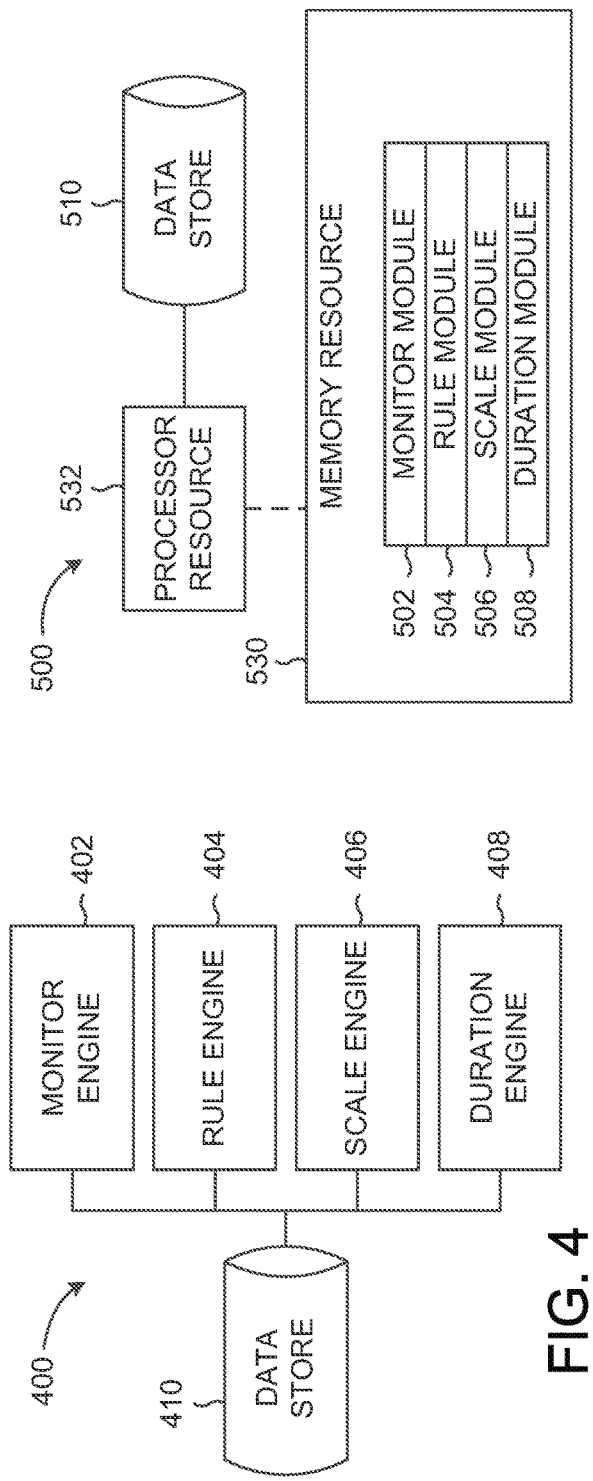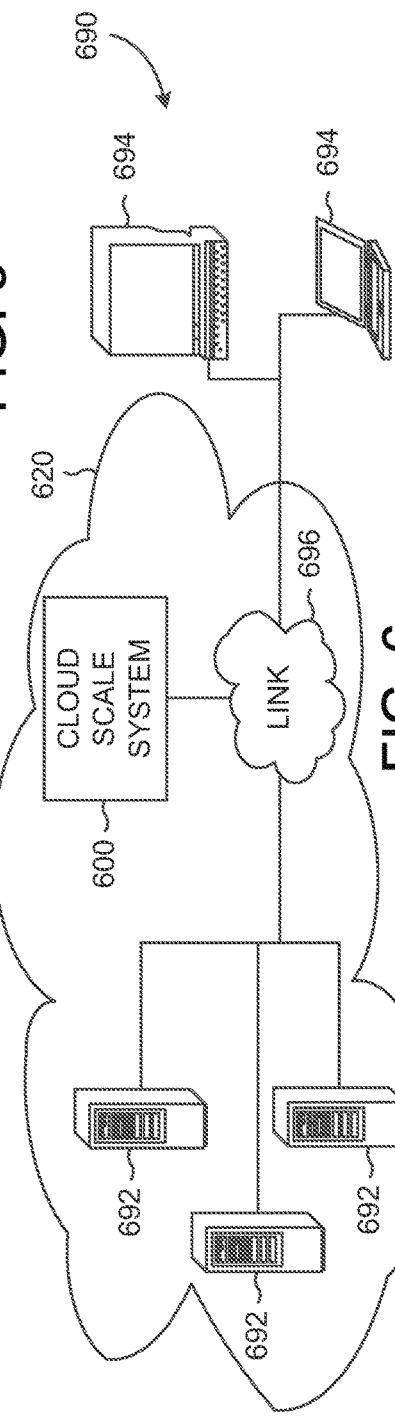

MAINTAIN A SERVICE ON A CLOUD NETWORK BASED ON A SCALE RULE

CROSS-REFERENCE TO RELATED APPLICATION

This application is a U.S. National Stage Application of and claims priority to international Patent Application No. PCT/US2013/057738, filed on Aug. 30, 2013, and entitled "MAINTAIN A SERVICE ON A CLOUD NETWORK BASED ON A SCALE RULE".

BACKGROUND

Cloud computing commonly utilizes a shared pool of computing resources. The computing environment, including the shared pool of resources, may be referred to as a "cloud." The resources may be virtual instances of resources running on a virtual machine. The pool of computing resource may provide a service. Cloud-based services are said to execute or reside "on the cloud." The computing environment, or cloud, may adapt to an increase in service usage by providing additional resource instances to the pool. The shared pool of resources may reside internal to a corporate network or external as part of the public Internet, respectively known as the private cloud and the public cloud. A hybrid cloud environment may utilize both a private cloud and a public cloud. For example, a service provider may provide a private cloud for non-peak service usage and the service provider may offload service requests to the public cloud during peak times, or times of high request rates. Cloud resource providers may provide resources, such as a central processing unit ("CPU") or computer memory, for services based on the type of cloud computing environment, which may include virtual machines. Cloud resource providers may offer variations on resource provisioning for services, including infrastructure as a service, platform as a service, storage as a service, and software as a service. Cloud resource providers may rent space on the cloud to service providers, or customers, for the service based on a cost per time period, cost per resource, subscription, or any other appropriate cost method.

BRIEF DESCRIPTION OF THE DRAWINGS

FIGS. 4 and 5 are block diagrams depicting example systems for maintaining a service on a cloud network.

FIG. 6 depicts example environments in which various examples for maintaining a service on a cloud network may be implemented.

DETAILED DESCRIPTION

In the following description and figures, some example implementations of systems and/or methods for maintaining a service on a cloud network are described. As used herein, a service may be any appropriate supplying of communication, transmissions, information, software, storage, or any other product or activity that may be capable of running on the cloud, or a cloud-based service. As used herein, a cloud may be any appropriate combination of physical and virtual resources pooled for computing and/or storage purposes. For example, a cloud may include any appropriate number of individual resources, servers, and server groups including virtual instances of resources, servers, and server groups. As used herein, a cloud network may include any appropriate number of clouds and/or other network of resources accessible by a network device.

Cloud resource providers may endeavor to maintain a quality of service for a customer based on resource utilization, or the amount and/or degree of resources utilized by the service. For example, the amount of resources assigned to a service may be highly utilized or underutilized based on any given time of the day. Cloud service providers may maintain the service by scaling the cloud based on the amount of resources utilized by the service. Scaling may refer to increasing or decreasing the shared pool of resources. Cloud resource providers may offer the ability to dynamically scale the cloud to adapt, to service spikes and lulls based on resource utilization. A service spike may occur when there is an increase in service requests or requests associated with providing the service. Accordingly, scaling based on resource utilization may enable an increase in assigning resource for utilizations that may be indirectly associated to the service. For example, the cloud resource provider may add cloud resources every day for a daily virus scan. The customer may be paying for an increase of cloud resources at times of unnecessary or unwanted scaling and may not know until arrival of the bill from the cloud resource provider.

Various examples described below relate to maintaining a service on a cloud network based on a scale rule. By monitoring resource utilization, quality of service ("QoS"), and workload volume, the cloud may be scaled while accounting for cost in the scale rule. For example, a cloud may be scaled based on resource utilization, QoS, the amount of service requests and a budget to reduce insufficient or excessive allocation of cloud resources to a service. The scale rule may account for and/or be adaptable to the desires and/or needs of the customer, in particular the customer's budget.

Figure 1:
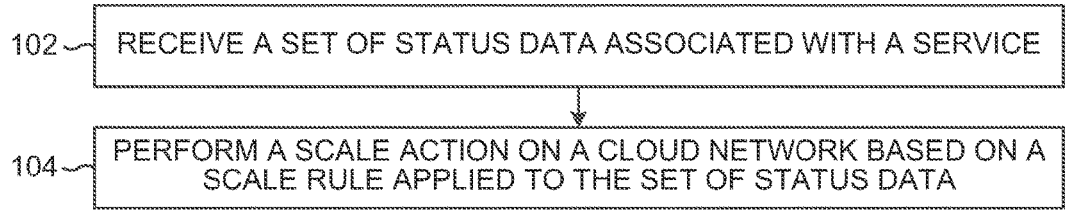
FIGS. 1 and 2 are block diagrams depicting example methods for maintaining a service on a cloud network.
Figure 2:
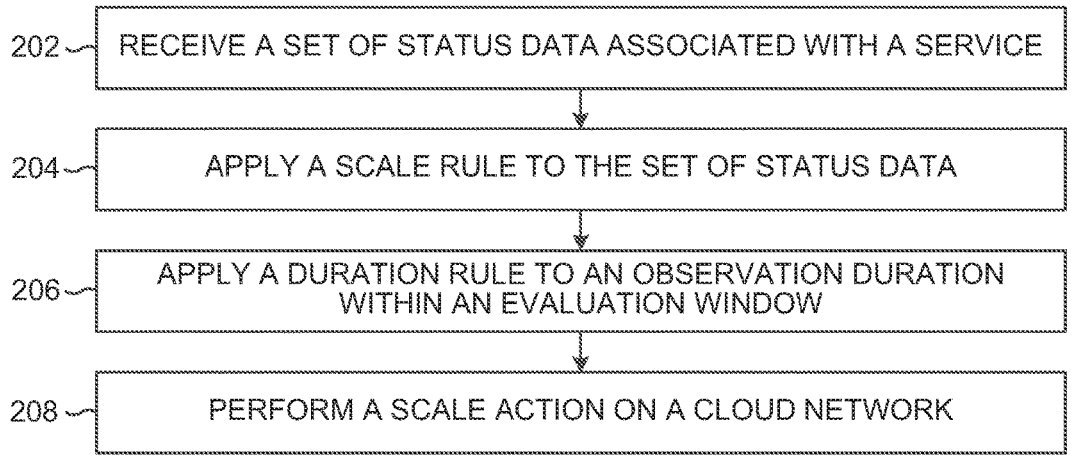

FIGS. 1 and 2 are block diagrams depicting example methods for maintaining a service on a cloud network. Referring to FIG. 1, an example method for maintaining a service on a cloud network may generally include receiving a set of status data and performing a scale action based on the set of status data.

In block 102, a set of status data associated with a service may be received. The set of status data may describe the state of the service being provided on a cloud network. For example, the set of status data may include a set of utilization data related to a set of resources utilized by the service, a set of quality data related to a performance level of the service, and a set of workload data related to a workload volume of the service. The cloud network may include a cloud, which may include any combination of a resource, a server, and a server group. The cloud network may include any number of additional clouds. The additional clouds may be of varying sizes.

The set of utilization may include or otherwise describe the amount of resources being zed by a service, how much of each of the resources are being utilized by a service, the frequency they are utilized by the service, etc. The resources may be any appropriate resource useable in a computing environment whether physical or virtual, including a CPU, a storage medium, etc. The set of quality data may include or otherwise describe data related to QoS, including service loss, time of completion of requests, latency, etc. The set of workload data may include or otherwise describe the rate of workload performed or requested to be performed by the service. For example, the set of workload data may include the rate of workload per second and the rate of workload may be the rate of service requests received.

By considering metrics, or analysis data, associated with resource utilization, QoS, and workload volume, a more complete decision can be made on whether to scale and in which dimension to scale in comparison to considering solely resource utilization. For example, if the service conditions show a set of resources as having high resource utilization and low quality of service, a resource may be added to the service. However, if workload volume is also high, a server group or an entire cloud may be added. Metrics may be monitored at any appropriate level of the cloud, including au individual resource, a server device, a server group, and/or an entire cloud. A resource, a server device, a server group, and/or a cloud may be referred to as a cloud unit and are discussed in more detail below and in the description associated with FIGS. 2-4.

In block 104, a scale action may be performed on a cloud network based on a scale rule applied to the set of status data. A scale action may be any appropriate change in the cloud network, such as adding a resource to a service or removing a resource from a service. The scale rule may include a set of conditions to satisfy for the scale action to occur on the cloud network. For example, the set of conditions may include a resource utilization condition associated with the set of resources utilized by the service, a quality condition associated with the performance level of the service, a workload condition associated with the workload volume of the service, and a budget condition associated with a cost of the service.

The scale action may involve a cloud unit. A cloud unit may be at least one of a resource, a server, a server group, and a cloud. A cloud unit may be physical, virtual, or a combination thereof. The scale action may include one of adding a cloud unit to the service and removing the cloud unit from the service. For example, a scale action may add a server to the database service and a second scale action may remove a server from the web service.

The scale action may occur in any appropriate dimension of scaling, including scaling at a resource level, a server level, a server group level, or a cloud level. For example, a resource level scale may include adding a resource to the service and a cloud level scale may include adding a cloud to the service. A scale action may also scale in a combination of dimensions. For example, the cloud may scale by removing a resource from the service and adding a server group to the service.

The scale action may relate to the scale rule and the set of conditions may be satisfied by metrics associated with a cloud network, a service, and/or a customer. A set of conditions may be met, or satisfied, when each of the metrics achieves an associated condition. For example, if a scale action is associated with a scale rule that has a resource utilization condition, a quality condition, a workload condition, and a budget condition, then the scale action may be performed if the set of status data associated with the metrics satisfy the resource utilization condition, the quality condition, the workload condition, and the budget condition. Each condition may be a minimum value, a maximum value, a range of values, or a combination thereof. For example, the workload condition may include a range of rates that satisfy the scale rule. Each condition may be satisfied depending on the type of condition used. For example, if the condition is a minimum value than the condition may be satisfied by a value that is equal to or greater than the minimum value or if the condition is a range than the condition is satisfied by a value within the range.

A customer may have a budget to spend on the service and/or the cloud resource provider. A scale action may be performed if the cost of the scaling action is within the budget allotted to the service by the customer. For example, even if the resource utilization condition, the quality condition, and the workload volume condition are satisfied, the scale action may not perform if the budget condition is not satisfied (i.e. the scale action would cost more than what the customer has budgeted for the service). The budget and associated budget condition may be provided in a service level agreement ("SLA"). The SLA may also provide the resource utilization condition, the quality condition, and the workload condition.

The description of the example method for maintaining a service on a cloud network of FIG. 1 may be applied to the description of the example method for maintaining a service on a cloud network of FIG. 2, and vice versa. For brevity, the complete description of one is not repeated in the description of the other and vice versa. Further details of the example methods are provided in the descriptions of FIGS. 3-6.

In block 202, the set of status data may be derived from the metrics provided by a monitor that may analyze the cloud network. The scale rule may provide a threshold or a set of thresholds to monitor. For example, the monitor may send an event notice when the metric surpasses a threshold of the scale rule. The set of thresholds may include a resource utilization threshold associated with a utilization level of a set of resources of the service, a quality threshold associated with a performance level of the service, and a workload threshold associated with a workload volume of the service. The monitor may monitor individual resources and/or groups of resources during runtime. Thresholds are discussed in more detail in the description associated with FIG. 4.

The set of status data may provide information associated with a group of servers providing the service or a group of servers to provide the service. The group of servers may be grouped based on a characteristic or a relationship. For example, a set of servers may be grouped based on a database service, a web service, and an application service into a database server group, a web server group, and an application group. The scale rule may be associated with a plurality of servers of a server group and may base the set of conditions on the server group. For example, at least one of the set of conditions may include a number of servers of the plurality of servers to satisfy the one of the set of conditions. The set of status data and the scale rule may be in the form of an aggregated amount of individual servers or a percentage of the servers of the group. For example, the scale rule may describe adding an additional web server to a group when 60% of the web server group has a high resource utilization, 20% of the web server group may have high quality of service, and the web server request workload volume per server is high on 70% of the web server group.

In block 204, applying a scale rule to a set of status data may include comparing a metric to an associated condition. For example, a set of status data may include a set of workload volume data and the set of workload volume data may be compared to the workload condition.

The set of conditions may be described by a domain specific language and may be associated with threshold values used by the monitors in sending event notices, including the set of status data. For example, a domain specific language may have a variable designated for "high"

and that variable may be associated with a percentage of a cloud unit at that metric, such as 90% resource utilization. The range of a condition of the scale rule may be defined by a domain specific language where the conditions are determined beforehand or during runtime of the service. For example, the domain specific language may allow the service to scale if the resource utilization is "high," and the term "high" may be defined by a predetermined condition range. Alternatively, the condition ranges may be based on a machine learning method or otherwise dynamically adaptive during runtime. A machine learning method may be any appropriate method that analyzes data associated with the service on the network that is adaptable to use with a scale rule. The domain specific language may use primitives describing any appropriate value or range of a metric associated with a cloud unit, including resources, servers, server groups, or clouds, that may meet a condition. For example, the primitive may be any appropriate amount of cloud units from none to all and may be described any appropriate manner, such as a percentage, ratio, or a range of values.

In block 206, a duration rule may be applied to an observation duration. The duration rule may include an evaluation window and a set of conditions associated with the time that metrics and/or the set of status data satisfy conditions of the scale rule.

The observation duration may be related to an accumulated length of time the set of status data satisfies the scale rule within the evaluation window. For example, if a high workload condition initiates the scale action, the duration rule may set that the workload condition be satisfied for an accumulated one minute of a five minute window before a scale action may occur. The duration rule may include an observation duration to assist against high frequency scaling for temporary conditions. For example, the scale rule may be met for thirty seconds as employees automatically log in to the service at the beginning of the work day, but the customer may not want to scale for this reason. The evaluation window may be a time frame to evaluate the observation duration. For example, the evaluation window may be a sliding five minute window or a static time from six o'clock to eleven o'clock in which the time the scale rule is satisfied may be stored, aggregated, or otherwise accumulated to be the observed duration.

The duration rule may assist scaling that may not occur because of the false negatives produced from using a continuous duration. For example, if a system without the duration rule scaled when a workload condition is satisfied for a continuous, one minute time length before initiating a scale action and the workload is high for thirty seconds every two minutes, a scale action may not perform because the scale rule may not be satisfied continually; however, the customer may want to scale the cloud because of the consistency of the requests. If a system using the duration rule is placed in a similar scenario where the observed duration is one minute and the evaluation window is five minutes, the duration rule may be satisfied and the scale action may occur.

The evaluation window and the observed duration may change dynamically. For example, during peak hours, the evaluation window may be a time frame of two minutes and the observed duration may be thirty seconds and, during non-peak hours, the evaluation window may change to a time frame of thirty minutes and the observed duration may change to be five minutes. The evaluation window and the observed duration may change dynamically based on a machine-learning method. A machine-learning method is discussed in more detail in the description associated with FIG. 4.

In block 208, the scale action may be performed on a cloud network and may include adding an entire cloud to the service. For example, a cloud network may be executing service privately and may assign service requests to a public cloud for peak service times. The scale rule may consider varying costs in cloud units, such as resources, of different forms of clouds or cloud networks. For example, performing the scale action in a private cloud may be cheaper than the performing the scale action in a public cloud.

A scale action may execute using a network device and/or programming instructions. For example, a server device may instantiate virtual machines to add a cloud unit and may terminate a virtual machine to remove a cloud unit. The scale action may also initiate another action related to maintenance of the cloud. For example after a scale action, a load balancer may distribute service requests across a server group according to a balancing method by reassigning the service or a service request from a first cloud unit to a second cloud unit. Hardware and programming instructions to implement the example methods of FIGS. 1 and 2 are discussed in more detail in the description associated with FIGS. 4 and 5.

Figure 3:
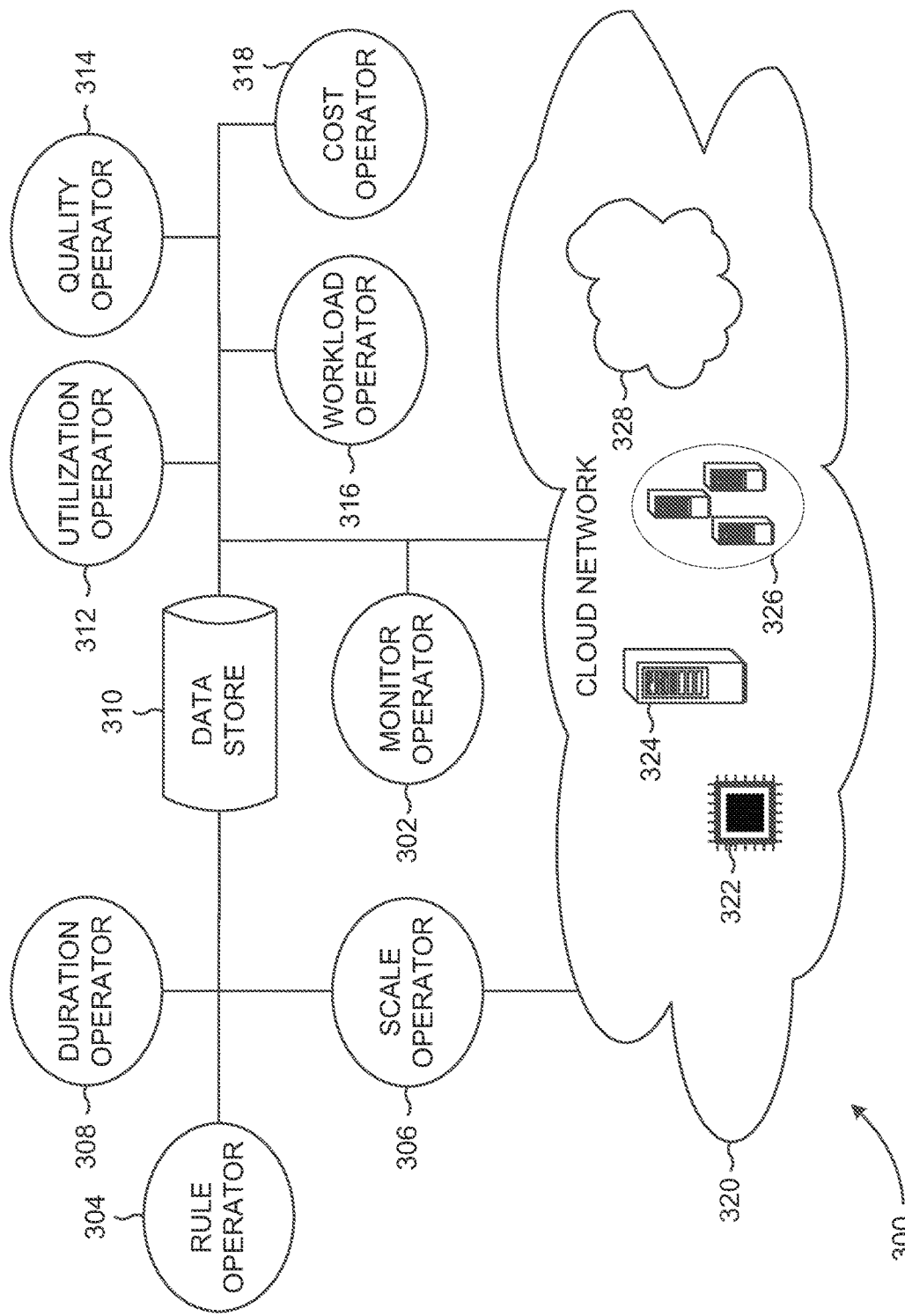
FIG. 3 depicts example operations for maintaining a service on a cloud network.

FIG. 3 depicts example operations for maintaining a service on a cloud network. The example operations described herein may be examples of a method and/or a system 300 for maintaining a service on a cloud network. The service may be performed on a cloud network 320. The cloud network 320 may include a resource 322, a server device 324, a server group 326, a cloud 328, and/or any additional cloud units, such as cloud units 322, 324, 326, and 328. The service may execute on any appropriate combination of cloud units.

The resource 322 may be any appropriate resource used in computing, such as a hard disk, a random-access memory ("RAM"), a CPU, or virtual representation thereof. The server device 324 may contain multiple resources, including virtual resources. For example, a server device 324 may execute a plurality of virtual machines having a set of resources 322. The server group 326 may be a group of server devices 324 that provide a related service. For example, a plurality of database servers may be grouped into a database server group. The cloud 328 may be a type of cloud in the cloud network 320 or assigned to a particular service. For example, the cloud network 320 may represent a hybrid cloud that contains a public cloud 328 and a private server group 326. The cloud 328 may include a plurality of server groups 326, server devices 324, and/or resources 322.

The monitor operator 302 may monitor a status of the cloud network 320 and/or a cloud unit of the cloud network 320. For example, a monitor operator 302 may track resource utilization associated with a resource 322 and workload volume associated with a server group 326. The monitor operator 302 may retrieve a set of status data based on the status of the cloud network 320 and/or a cloud unit of the cloud network 320.

The monitor operator 302 may be coupled to a data store 310. The data store 310 may store a set of status data. The monitor operator 302 may work in conjunction with other operators to store a set of status data in the data store 310. For example, the monitor operator 302 may manage a utilization operator 312 for monitoring resource utilization of a service, a quality operator 314 for monitoring the quality of a service, a workload operator 316 for monitory the workload volume of a service, and a cost operator 318 for retrieving and/or verifying the cost of a service. The operators 302, 312, 314, 316, and 318 may place data in the data store 310 based on a set of thresholds. The set of thresholds may be based on the set of conditions of the scale rule. The data store 310 may be any appropriate storage medium capable of containing the data retrieved from operators 302, 312, 314, 316, and 318, such as the set of status data.

The rule operator 304 may apply a scale rule to the set of status data. The rule operator 304 may receive a scale rule, including a set of conditions, from the data store 310 or an application programming interface ("API") accessible by the customer or the cloud service provider. The rule operator 304 may receive the set of status data from the data store 310. The set of status data may be applied to the set of conditions and/or set of thresholds associated with the data monitored and/or retrieved by monitor operator 302. For example, the scale rule may include a resource utilization condition, a quality condition, a workload condition, and a budget condition and a set of status data may be retrieved by the utilization operator 312, the quality operator 314, the workload operator 316, and the cost operator 318 to compare the set of status data to the set of conditions.

The scale operator 306 may perform a scale action on the cloud network 320 if the scale rule is satisfied. The scale action may add a cloud unit to the service or remove a cloud unit to the service. For example, if the scale rule for scaling out the cloud network 320 to service a high amount of requests is satisfied, then the scale operator 306 may add a public cloud 328 to assist completion of the requests. Once the amount of requests reduces, a second scale rule may scale in the cloud network 320 by removing the public cloud 328 from the service. As mentioned above, the cloud unit may be virtual. Therefore, a server device 324 or a server group 326 may dynamically instantiate or terminate a virtual resource 322, a virtual machine (for example a server device 324), or any other virtualization of a cloud unit.

The duration operator 308 may apply a duration rule to the set of status data. The duration operator 308 may ensure that the scale action occurs when the set of status data satisfies the set of conditions of the scale rule for the observed duration within an evaluation window. For example, the scale operator 306 may not perform a scale action on the cloud network 320 if the duration rule is not satisfied, even if the scale rule is satisfied. As discussed herein, the observed duration may be an accumulated length of time the set of status data have met the set of conditions of the scale rule.

In general, the operators 302, 304, 306, and 308 of FIG. 3 described above may represent operations, processes, interactions, and/or other actions performed by or in connection with the engines 402, 404, 406, and 408 of FIG. 4.

FIGS. 4 and 5 are block diagrams depicting example systems for maintaining a service on a cloud network. Referring to FIG. 4, an example system 400 for maintaining a service on a cloud network may generally include a monitor engine 402, a rule engine 404, and a scale engine 406. The example system 400 may also include a duration engine 408 and a data store 410. The data storage 410 may be the same as the data store 310 of FIG. 3 and the description associated with the data store 310 may be applied to the data store 410, and vice versa, as appropriate.

The monitor engine 402 may represent any appropriate combination of hardware and programming configured to maintain a set of status data associated with a resource utilization of the service, a quality of the service, and a workload volume of the service. The monitor engine 402 may maintain the set of status data continuously, dynamically, or based on a schedule.

The monitor engine 402 may receive a set of thresholds from the rule engine 404 based on a set of conditions of a scale rule. The set of thresholds may include a resource utilization threshold associated with a set of resources utilized by the service, a quality threshold associated with a performance level of the service, and a workload threshold associated with the workload volume of the service. The resource utilization threshold may include a utilization level of the set of resources of the service, a percentage of a resource used by the service, or other metric related to resource utilization. The quality threshold may include a request completion rate, a packet loss rate, latency, or other metrics related to performance quality. The workload threshold may include service request per time period or other metric related to a rate of workload, or workload volume.

The set of status data may include data related to the set of thresholds. For example, the set of status data may include a set of resource utilization data associated with a set of resources utilized by the service, a set of quality data associated with a performance level of the service, and a set of workload data associated with the workload volume of the service.

The monitor engine 402 may be coupled to a data store 410. The monitor engine 402 may maintain the set of status data by adding, modifying, updating, and/or deleting a set of status data contained in a data store 410. The data store 410 may be a storage medium capable of containing data associated with the service, such as a set of resource utilization data, a set of quality data, a set of workload data, and a set of cost data.

The cost of the service and the budget of the customer may be made available to the monitor engine 402 by the rule engine 404 described below. The set of status data may include the cost of the service and the budget condition associated with the cost of the service. The cost of the service may be attainable from a public server, a website, an API an SLA, or any other document or accessible medium. The cost of the service may include the cloud unit cost associated with one of the resource, the server, the server group, and the cloud.

The monitor engine 402 may monitor the cloud network based on individual cloud units, service transactions, or a cloud unit group. The cloud unit group may include a plurality of cloud units utilized by the service where each of the plurality of cloud units is related by type or another appropriate relationship for group the cloud unit. For example, each of the plurality of cloud units may have a service relationship to each of the plurality of cloud units, such as a plurality of web servers.

The monitor engine 402 may aggregate the set of status data of the cloud unit group. The set of conditions may be based on a ratio of a portion of the plurality of the cloud units that satisfy the set of conditions to the plurality of cloud units. For example, if there are ten cloud units and the scale action will be performed if the set of conditions of the scale rule is satisfied by 70% of the cloud units, then the monitor engine 402 may send out a set of status data when seven of the ten cloud units satisfy the set of conditions.

The monitor engine 402 may monitor the cloud network and/or maintain the data store 410 continuously, dynamically, or based on a schedule. For example, the monitor engine 402 may obtain status updates every minute. The monitor engine 402 may send an event notification containing the set of status data to the rule engine 404 continuously, dynamically, or based on a schedule. For example, the monitor engine 402 may send an event notification to the rule engine 404 when a threshold is achieved. The rule engine 404 may receive the event notification and compare the set of status data to the scale rule.

The rule engine 404 may represent any appropriate combination of hardware and programming configured to apply a scale rule to the set of status data. The scale rule may include a set of conditions to be satisfied by the set of status data. For example, the set of conditions may include a resource utilization condition to compare to the resource utilization of the service, a quality condition to compare to the quality of the service, a workload condition to compare to the workload volume of the service, and a budget condition to compare to a cost of the service.

The rule engine 404 may receive the set of conditions based on a domain specific language and may use the set of conditions to determine a set of thresholds to be monitored by the monitor engine 402. For example, a domain specific language may provide primitives of high, medium, and low, that may be determined by the rule engine 404 to monitor a set of thresholds that are greater than 71%, between 70% and 41%, and less than 40% respectively. The domain specific language may allow the rule engine 404 to scale based on maximum values, minimum values, ratios, and/or percentages of a cloud unit group.

The rule engine 404 may receive the set of status data from the monitor engine 402. The set of status data may be the level of the metrics monitored by the monitor engine 402. For example, the set of status data may include the level of resource utilization, the level of performance, and the level of workload volume. The set of status data may be a primitive of the domain specific language associated with the metrics monitored by the monitor engine 402. For example, the monitor engine 402 may send an event to the rule engine 404 when the web server resource utilization is at 80% and the set of status data may be the high primitive; the rule engine 404 may then compare the set of conditions of the scale rule to the high primitive.

At least one of the resource utilization condition, the quality condition, the workload condition, the budget condition, and the observed duration condition (discussed with the duration engine 408 below) may be maintained dynamically based on a machine-learning method. The machine-learning method may observe the service and learn the environment and times when the set of conditions are satisfied or times when the cloud network scales. The machine-learning method may apply the knowledge learned an update the set of conditions and/or the set of thresholds, accordingly.

The scale engine 406 may represent any appropriate combination of hardware and programming configured to maintain a cloud unit of a cloud network based on a scale rule and a set of status data. The scale engine 406 may maintain a service by performing a scale action on the cloud network. The scale engine 406 may perform a scale action based on the scale rule applied to the set of status data. For example, based on the scale rule, the scale engine 406 may be configured to at least one of add the cloud unit to the service and remove the cloud unit from the service.

The scale engine 406 may be configured to receive a scale notification from the rule engine 404. For example, the rule engine 404 may send a scale notification to the scale engine 406 when the set of conditions of the scale rule have been satisfied. The scale notification may include the dimension(s) to scale and the cloud unit(s) to scale. For example, the scale notification may contain a request to add a server group to the service.

The scale engine 406 may request a cloud network action in conjunction with the scale actions. For example, a load balancing action may balance the service load when a cloud unit is added to or removed from the service.

The duration engine 408 may represent any appropriate combination of hardware and programming configured to apply a duration rule to an accumulated length of time the set of status data satisfies the scale rule within an evaluated window. The duration engine 408 may track the accumulated length of time the set of status data satisfies the scale rule within an evaluation window. For example, the duration engine 408 may analyze the set of status data in the data store 410 based on an evaluation window to compare whether the accumulated length of time within the evaluation window achieves an observed duration threshold to satisfy an observed duration condition. The duration engine 408 may work in conjunction with the monitor engine 402 and the rule engine 404 to increase a time variable, such as an observed duration, as the set of status data satisfies the scale rule, and decrease the time variable as the evaluation window changes. The scale engine 406 may maintain the cloud unit if the accumulated length of time satisfies an observed duration condition.

The duration engine 408 may be configured to send a duration notification to the scale engine 406 and/or the rule engine 404. For example, the scale engine 406 may wait to perform a scale action until both a scale notification and a duration notification are received. For another example, the rule engine 404 may wait to send a scale notification until a duration notification is received.

FIG. 5 depicts that the example system 500 for maintaining a service on a cloud network may be implemented on a memory resource 530 operatively coupled to a processor resource 532. The processor resource 532 may be operatively coupled to the data store 510. The data store 510 may be the same as the data store 310 of FIG. 3 and/or the data store 410 of FIG. 4 and the description associated with the data store 310 and/or the data store 410 may be applied to the data store 510, and vice versa, as appropriate.

Referring to FIG. 5, the memory resource 530 may contain a set of instructions that may be executable by the processor resource 532. The set of instructions may implement the system 500 when executed by the processor resource 532. The set of instructions stored on the memory resource 530 may be represented as a monitor module 502, a rule module 504, a scale module 506, and a duration module 508. The processor resource 532 may carry out the set of instructions to execute the monitor module 502, the rule module 504, the scale module 506, the duration module 508, and/or any appropriate operations between or otherwise associated with the modules of the system 500. For example, the processor resource 532 may carry out a set of instructions to maintain a set of status data associated with a resource utilization of the service, apply the set of status data to a scale rule, and maintain a cloud unit based on the scale rule. The monitor module 502 may represent program instructions that when executed function as the monitor engine 402 of FIG. 4. The rule module 504 may represent program instructions that when executed function as the rule engine 404 of FIG. 4. The scale module 506 may represent program instructions that when executed function as the scale engine 406 of FIG. 4. The duration module 508 may represent program instructions that when executed as the duration engine 408 of FIG. 4.

The processor resource 532 may be one or multiple CPUs capable of retrieving instructions from the memory resource 530 and executing those instructions. The processor resource 532 may process the instructions serially, concurrently, or in partial concurrence, unless described otherwise herein.

The memory resource 530 and the data store 510 may represent a medium to store data utilized by the system 500. The medium may be any non-transitory medium or combination of non-transitory mediums able to electronically store data and/or capable of storing the modules of the system 500 and/or data used by the system 500. A storage medium, such as memory resource 530, may be distinct from a transmission medium, such as a signal. The medium may be machine-readable, such as computer-readable. The data of the data store 510 may include representations of resource utilization, QoS, workload volume, cost, and/or other data or information mentioned herein, such as a duration values and/or time values.

In the discussion herein, engines 402, 404, 406, and 408 and the module 502, 504, 506, and 508 have been described as combinations of hardware and programming. Such components may be implemented in a number of fashions. Looking at FIG. 5, the programming may be processor executable instructions stored on the memory resource 530, which is a tangible, non-transitory computer readable storage medium, and the hardware may include processor resource 532 for executing those instructions. The processor resource 532, for example, may include one or multiple processors. Such multiple processors may be integrated in a single device or distributed across devices. For example in reference to FIG. 6, the processor resource 532 may be distributed across any combination of server devices 692 and client devices 694. The memory resource 530 may be said to store program instructions that when executed by processor resource 532 implements the system 500 in FIG. 5. The memory resource 530 may be integrated in the same device as processor resource 532 or it may be separate but accessible to that device and processor resource 532. The memory resource 530 may be distributed across devices, such as server devices 692 and client devices 694 of FIG. 6. The memory resource 530 and the data store 510 may represent the same physical medium unless otherwise described herein.

In one example, the program instructions may be part of an installation package that when installed may be executed by processor resource 532 to implement the system 500. In this case, memory resource 530 may be a portable medium such as a CD, DVD, or flash drive or memory maintained by a server device, such as server device 692 of FIG. 6, from which the installation package may be downloaded and installed. In another example, the program instructions may be part of an application or applications already installed. Here, the memory resource 530 may include integrated memory such as a hard drive, solid state drive, or the like.

FIG. 6 depicts example environments in which various examples for maintaining a service on a cloud network may be implemented. The environment 690 is shown to include a cloud scale system 600 for maintaining a service on a cloud network. The system 600 described herein with respect to FIGS. 4 and 5, may represent generally any combination of hardware and programming configured to maintain a service on a cloud network. The system 600 may be integrated into a server device 692 or a client device 694. The system 600 may be distributed across server devices 692, client devices 694, or a combination of server devices 692 and client devices 694. The environment 690 may be a cloud computing environment. For example, any combination of the system 600, server device 692, and client devices 694 may be a virtual instance and/or may reside and/or execute on a cloud. The environment 690 may include a cloud computing environment, such as a cloud network 620. The cloud network 620 may be the same as the cloud network 320 of FIG. 3 and the description associated with the cloud network 320 may be applied to the cloud network 620, and vice versa, as appropriate.

In the example of FIG. 6, a server device 692 may access a client device 694. The server devices 692 may represent generally any computing devices configured to respond to a network request received from the client device 694. For example, a server device 692 may be a cloud unit of the cloud network 620 providing the service and the client device 694 may be a computing device configured to access the cloud network 620 and receive and/or communicate with the service. A server device 692 may include a web server, an application server, or a data server. The client devices 694 may represent generally any computing devices configured with a browser or other application to communicate such requests and receive and/or process the corresponding responses. A link 696 may represent generally one or any combination of a cable, wireless, fiber optic, or remote connections via a telecommunications link, an infrared link, a radio frequency link, or any other connectors of systems that provide electronic communication. The link 696 may include, at least in part, intranet, the Internet, or a combination of both. The link 696 may also include intermediate proxies, routers, switches, load balancers, and the like.

Referring to FIGS. 4-6, the engines 402, 404, 406, and 408 and/or the module 502, 504, 506, and 508 may be distributed across any combination of server devices, client devices, and storage mediums. The engines 402, 404, 406, and 408 and/or the module 502, 504, 506, and 508 may complete or assist completion of operations performed in describing another engine 402, 404, 406 and 408 and/or the module 502, 504, 506, and 508. The engines 402, 404, 406, and 408 and/or the module 502, 504, 506, and 508 may perform the example operations of operators 302, 304, 306, and 308 and/or the example methods described in connection with FIGS. 1 and 2.

Although the flow diagrams of FIGS. 1 and 2 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present description has been shown and described with reference to the foregoing examples. It is understood, however, that other forms, details, and examples may be made without departing from the spirit and scope of the invention that is defined in the following claims.

What is claimed is:

1. A method for maintaining a service on a cloud network comprising:
    receiving a set of status data associated with the service, the set of status data including a set of utilization data related to a set of resources utilized by the service, a set of quality data related to a performance level of the service, and a set of workload data related to a workload volume of the service;
    performing a scale action on the cloud network based on a scale rule applied to the set of status data, the scale rule including a set of conditions, the set of conditions including a utilization condition associated with the set of resources utilized by the service, a quality condition associated with the performance level of the service, a workload condition associated with the workload volume of the service, and a budget condition associated with a cost of the service; and applying a duration rule to the set of status data, wherein the duration rule comprises an observation duration for the set of status data to satisfy the scale rule, wherein the observation duration comprises an accumulated length of time that the set of status data satisfies the scale rule within an evaluation window, wherein the evaluation window comprises a time frame to evaluate the observation duration.

2. The method of claim 1, wherein the scale action includes at least one of:
add a first cloud unit to the service, wherein the first cloud unit is at least one of a resource, a server, a server group, and a cloud; and
remove a second cloud unit from the service, wherein the second cloud unit is at least one of the resource, the server, the server group, and the cloud.

3. The method of claim 1, wherein the set of workload data includes the rate of workload requests per second and the workload condition includes a range of rates that satisfy the scale rule.

4. The method of claim 1, wherein at least one of the set of conditions is associated with a plurality of servers and includes a number of servers of the plurality of servers to satisfy the one of the set of conditions.

5. The method of claim 1, wherein the scale rule is associated with a plurality of servers of a cloud unit in the cloud network that are grouped based on a characteristic.

6. The method of claim 1, wherein the set of status data is aggregated from a plurality of cloud units and the set of conditions is based on a ratio of a portion of the plurality of cloud units that satisfy the set of conditions.

7. The method of claim 1, wherein the scale action comprises adding an entire cloud service.

8. A system for maintaining a service on a cloud network comprising:
a processor; and
a non-transitory computer readable storage medium having a set of instructions executable by the processor, the set of instructions comprising:
instructions to
maintain a set of status data associated with a resource utilization of the service, a quality of the service, and a workload volume of the service;
instructions to
apply a scale rule to the set of status data, the scale rule including a set of conditions, the set of conditions including a resource utilization condition to compare to the resource utilization of the service, a quality condition to compare to the quality of the service, a workload condition to compare to the workload volume of the service, and a budget condition to compare to a cost of the service;
instructions to
maintain a cloud unit based on the scale rule and the set of status data, wherein the cloud unit is at least one of a resource, a server, a server group, and a cloud; and
instructions to apply a duration rule to the set of status data, wherein the duration rule comprises an observation duration condition for the set of status data to satisfy the scale rule, wherein the observation duration condition comprises an accumulated length of time that the set of status data satisfies the scale rule within an evaluation window, wherein the evaluation window comprises a time frame to evaluate the observation duration condition.

9. The system of claim 8, wherein the the instructions to maintain a cloud unit based on the scale rule comprises at least one of:
instructions to add the cloud unit to the service; and
instructions to remove the cloud unit from the service.

10. The system of claim 8, wherein the instructions to maintain the cloud unit comprises instructions to maintain the cloud unit if the accumulated length of time satisfies the observation duration condition.

11. The system of claim 8, wherein at least one of the resource utilization condition, the quality condition, the workload condition, the budget condition, and the observed duration condition, is maintained dynamically based on a machine-learning method.

12. The system of claim 8, wherein the set of status data includes the cost of the service and the budget condition associated with the cost of the service, the cost of the service including the cloud unit cost associated with the one of the resource, the server, the server group, and the cloud.

13. The system of claim 8, wherein the scale rule is associated with a plurality of servers of a cloud unit in the cloud network that are grouped based on a characteristic.

14. The system of claim 8, wherein the set of status data is aggregated from a plurality of cloud units and the set of conditions is based on a ratio of a portion of the plurality of cloud units that satisfy the set of conditions.

15. A non-transitory computer readable storage medium having instructions stored thereon executable by a processor, the instructions including:
instructions to maintain a set of status data associated with a resource utilization of the service, a quality of the service, and a workload volume of the service;
instructions to apply the set of status data to a scale rule, the scale rule including a set of conditions, the set of conditions including a resource utilization condition to compare to the resource utilization of the service, a quality condition to compare to the quality of the service, a workload condition to compare to the workload volume of the service and a budget condition to compare to a cost of the service;
instructions to maintain a cloud unit based on the scale rule, wherein the cloud unit is at least one of a resource, a server, a server group, and a cloud; and
instructions to apply a duration rule to the set of status data, wherein the duration rule comprises an observation duration for the set of status data to satisfy the scale rule, wherein the observation duration comprises an accumulated length of time that the set of status data satisfies the scale rule within an evaluation window, wherein the evaluation window comprises a time frame to evaluate the observation duration.

16. The non-transitory computer readable storage medium of claim 15, wherein the instructions to maintain a cloud unit based on the scale rule comprises at least one of:
instructions to add the cloud unit to the service; and
instructions to remove the cloud unit from the service.

17. The non-transitory computer readable storage medium of claim 15, further comprising:
instructions to receive, based on a domain specific language, the set of conditions associated with a cloud unit group, the cloud unit group including a plurality of cloud units utilized by the service, each of the plurality of cloud units having a relationship to each of the plurality of cloud units.

18. The non-transitory computer readable storage medium of claim 17, wherein the the instructions to maintain the set of status data associated with a resource utilization of the service comprises instructions to aggregate the set of status data of the cloud unit group, the set of conditions based on a ratio of a portion of the plurality of the cloud units that satisfy the set of conditions to the plurality of cloud units.

19. The non-transitory computer readable storage medium of claim 15, wherein the scale rule is associated with a plurality of servers of a cloud unit in the cloud network that are grouped based on a characteristic.

20. The non-transitory computer readable storage medium of claim 15, wherein the set of status data is aggregated from a plurality of cloud units and the set of conditions is based on a ratio of a portion of the plurality of cloud units that satisfy the set of conditions.

* * * * *